Sept. 28, 1943.   R. E. CYR   2,330,410
BAKER'S SHEET
Filed July 7, 1941   2 Sheets-Sheet 1
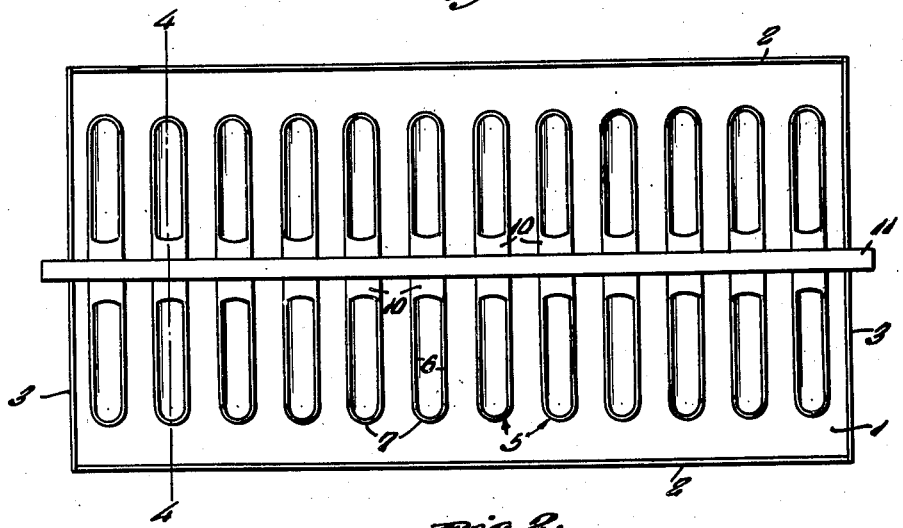
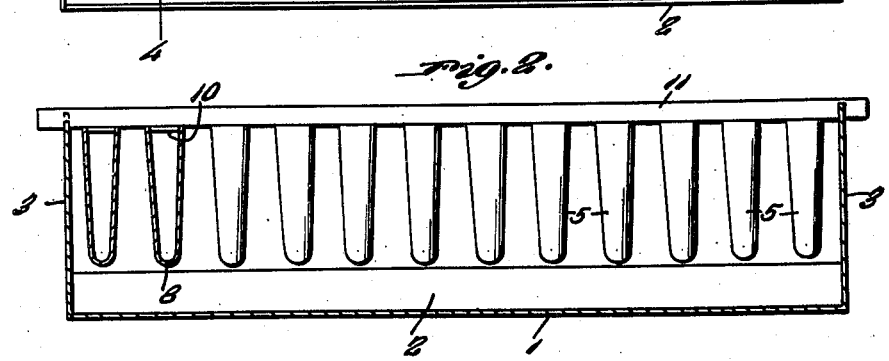
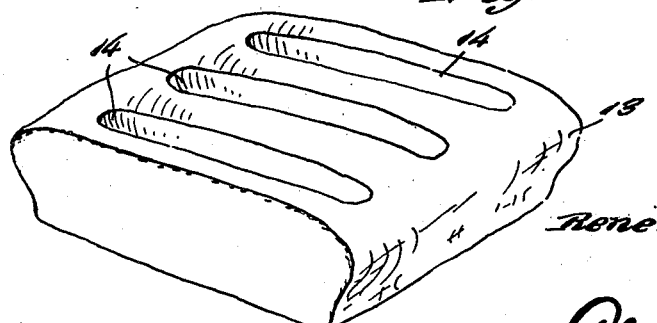
Inventor
Rene E. Cyr
By Clarence A. O'Brien
Attorney Sept. 28, 1943.    R. E. CYR    2,330,410
BAKER'S SHEET
Filed July 7, 1941    2 Sheets-Sheet 2
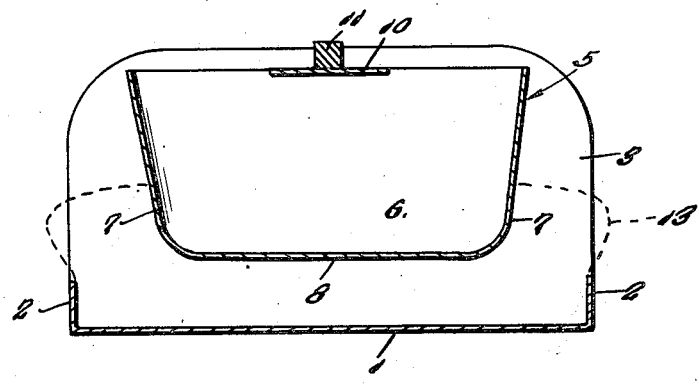
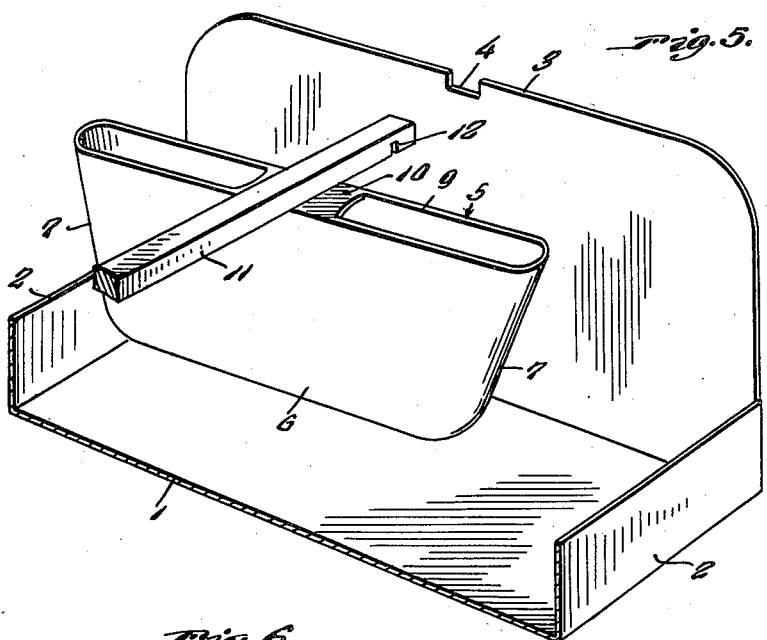
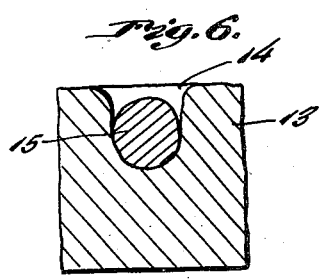
Inventor
Rene E. Cyr
By Clarence A. O'Brien
Attorney Patented Sept. 28, 1943

2,330,410

UNITED STATES PATENT OFFICE 2,330,410

BAKER'S SHEET

Rene E. Cyr, Lewiston, Maine

Application July 7, 1941, Serial No. 401,367

2 Claims. (Cl. 53—6)

My invention relates to improvements in baker's sheets, or pans, such as are used in baking rolls for making so-called hot-dog sandwiches.

It is the usual practice in serving such sandwiches to split the rolls to accommodate the hot-dog sausage and relish. This operation is time consuming and unsatisfactory for the reason that the split is frequently not large enough to permit the insertion of the hot-dog sausage and the relish in the roll.

Having the foregoing in mind, it is the particular object of my invention to equip a baker's sheet, inexpensively, with efficient, sanitary means for molding in the tops of the rolls, during baking, deep lengthwise extending pockets for accommodating the hot-dog sausage and relish.

Another object is to provide a molding attachment for a baker's sheet, for the purpose above set forth, without resorting to material change in the basic structure of the baker's sheet, and to provide an attachment which may be easily kept clean, is strong and durable, and inexpensive to manufacture.

To the accomplishment of the above, and the subordinate objects presently appearing, a preferred embodiment of my invention has been illustrated in the accompanying drawings, set forth in detail in the succeeding description, and defined in the claims appended hereto.

In said drawings:

Figure 1 is a view in top plan of the preferred embodiment of my invention,

Figure 2 is a view in longitudinal vertical section, with parts shown in elevation, Figure 3 is a view in perspective of a batch of the rolls illustrating the pockets therein, Figure 4 is a view in transverse section taken on the line 4—4 of Figure 1 and drawn to an enlarged scale, Figure 5 is a fragmentary view in perspective of the baker's sheet and molding means, and Figure 6 is a detail view in transverse section illustrating the manner in which the hot-dog sausage is accommodated in the pocket formed in a roll.

Reference being had to the drawings by numerals, the baker's sheet with which my invention is concerned is of elongated rectangular form comprising a flat bottom 1, low sides 2, and higher ends 3 and said ends are each provided in the vertical center thereof with a square upper edge notch 4. As will be understood, such sheets are designed for baking therein a batch of a dozen long rolls extending lengthwise across the sheet.

For attachment to the ends 3, in a manner presently described, a molding unit is provided comprising a battery of hollow, elongated molds of any suitable material, designated by the numeral 5, each of which comprises flat, downwardly converging sides 6, transversely rounded downwardly converging ends 7, a rounded bottom 8 and an open top 9 having a central flat web 10 extending across the same. The molds 5 are suspended from a hanger bar 11 in equidistant laterally spaced relation and to extend lengthwise crosswise of the bar, the web 10 of each mold being suitably secured to the underside of the bar flat against said side. The hanger bar 11 is preferably square transversely and slightly longer than the distance between the ends 3, said bar being of the proper size to fit at its ends in the beforementioned notches 4. A transverse groove 12 is provided in the underside of the bar 11 adjacent each end thereof for fitting over the bottom edge of the notch 4 and frictionally interlocking therewith. The molds 5 are of the proper depth to form in the rolls 13, during baking of the latter, longitudinally extending pockets 14 of sufficient depth to contain the hot-dog sausage 15 and a serving of relish to accompany the same.

As will be manifest, the described mold unit may be easily detached from the ends 3 by merely lifting the ends of the hanger bar 11 out of the notches 4, and the molds 5 may be easily kept clean because of their hollow construction and described shape. Also because of their hollow construction, the molds 5 are easily heated and function to bake the dough around the pockets 14.

The foregoing will, it is believed, suffice to impart a clear understanding of my invention without further explanation.

Manifestly the invention, as described, is susceptible of modification without departing from the inventive concept, and right is herein reserved to such modifications as fall within the scope of the subjoined claims.

What I claim is:

1. In combination, a baker's sheet for rolls including end walls, and relatively lower side walls, a mold unit comprising a plurality of elongated flat hollow members, and means to suspend said members from said end walls to extend laterally across said sheet in longitudinally spaced relation and upright position and with the bottoms thereof substantially level with the upper edges of said side walls to mold elongated shallow pockets with closed ends in dough baked in said sheet.

2. In combination, a baker's sheet for rolls including end walls, and relatively lower side walls, a mold unit comprising a plurality of elongated flat hollow members, and means to suspend said members from said end walls to extend laterally across said sheet in longitudinally spaced relation and upright position and with the bottoms thereof substantially level with the upper edges of said side walls to mold elongated shallow pockets with closed ends in dough baked in said sheet, said means comprising a bar to which said members are fixed to extend transversely thereof, and coacting notches in the ends of said bar and the top edges of said end walls for frictionally interlocking the ends of said bar to said end walls.

RENE E. CYR.